H. H. ABBE.
Door Bell.
No. 2,134. Reissued Dec. 26, 1865.
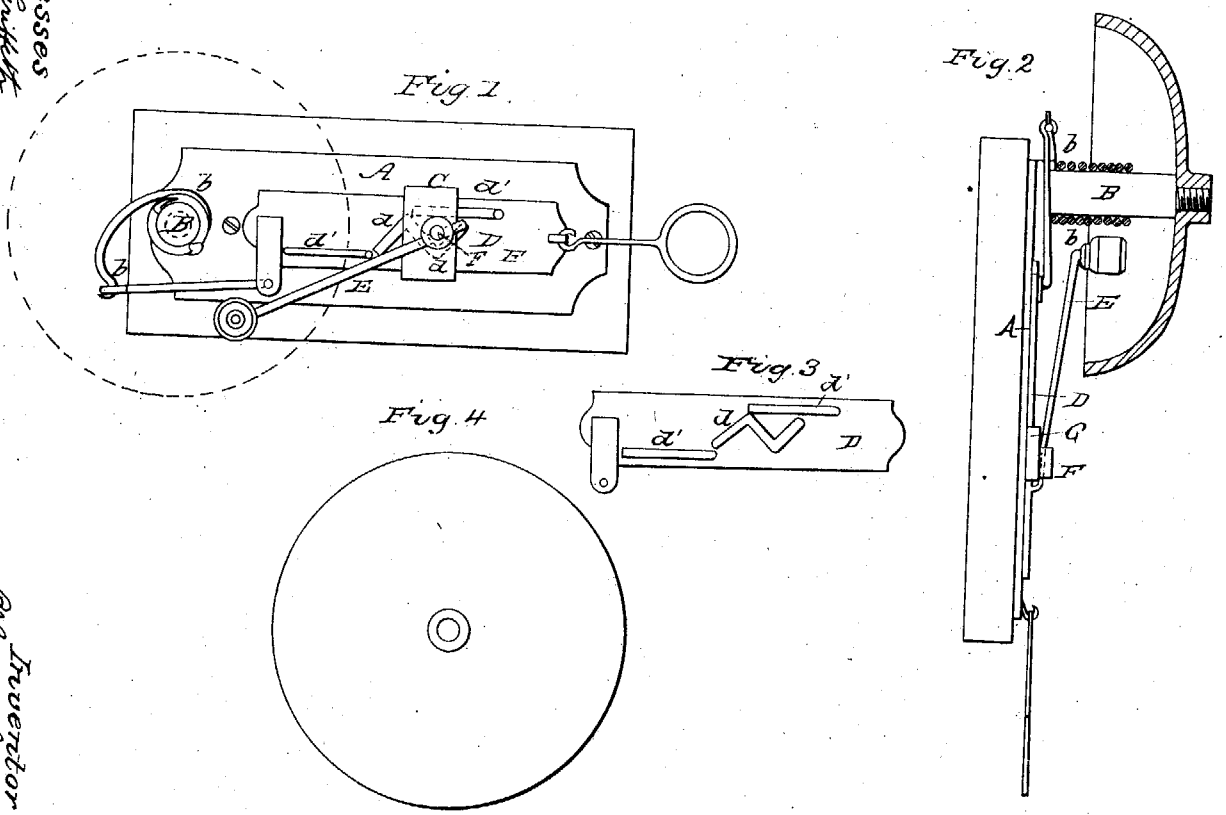
Witnesses
Joshua Griffith
Alexander H. Markham
Inventor
Horatio H. Abbe
N. PETERS, Photo-Lithographer, Washington, D. C.

UNITED STATES PATENT OFFICE.

H. H. ABBE, OF CHATHAM, CONNECTICUT.

DOOR-BELL.

Specification forming part of Letters Patent No. 48,637, dated July 11, 1865; Reissue No. 2,134, dated December 26, 1865.

*To all whom it may concern:*

Be it known that I, HORATIO H. ABBE, of Chatham, in the county of Middlesex and State of Connecticut, have invented a new and Improved Door Bell or Gong; and I do hereby declare that the following is a full, clear, and exact description thereof, which will enable those skilled in the art to make and use the same, reference being had to the accompanying drawings, forming part of this specification, in which—

Figure 1 is a view of the working parts of the device complete, the position of the bell being indicated in red outlines; Fig. 2, a side sectional view of the same, the plane of section passing through the center, the bell being shown in black, and also bisected; Fig. 3, a detached view of the sliding plate pertaining to the same; Fig. 4, a detached exterior view of the bell.

Similar letters of reference indicate like parts.

I use for the base of my bell a plate, A, with the box B, to which the bell proper is attached, and the clasp C, beneath which the slide D works up and down, and upon the top of which the bell-lever or clapper-stem E is attached by a pivot, F, in a manner to allow the clapper free lateral motion. The straight grooves *d'*, near the edges of the slide, are designed to keep the latter in place, and the central zigzag groove, *d*, receives the foot of the bell-lever or clapper-stem E below its pivot attachment, and when the slide D moves the foot of the lower or short arm of the bell-lever or clapper-stem follows the zigzag groove *d*, giving to the clapper three strong and rapid strokes. The spring *b*, extending from the bell-post B and attached to the slide D, forces the slide back, giving also three strong and rapid strokes to the clapper, the same as produced by the pull. The motion of the slide may be readily shortened, so as to obtain two or even one stroke at a pull.

The great advantage of this invention consists in the independent arrangement of the bell lever or clapper with the spring which operates it after the pull. All other door bells or gongs which are stationary and have their bell lever or clapper operated by the pull have, so far as I am aware, their bell lever or clapper connected directly with the spring, and the springs and lever or clapper are very liable to get out of proper working order.

Having thus described my invention, I claim as new and desire to secure by Letters Patent—

The employment or use in a door bell or gong of a lever or clapper-stem operated under the pull by a grooved slide, or other suitable mechanism, having a spring attached to it, whereby the lever or clapper-stem, although operated after the pull by the spring, is not directly connected with the latter.

The above specification of my reissue signed by me this 24th day of November, 1865.

HORATIO H. ABBE.

Witnesses:
M. M. LIVINGSTON,
WM. E. LYON.